(12) United States Patent
Wild et al.

(10) Patent No.: US 10,920,114 B2
(45) Date of Patent: Feb. 16, 2021

(54) LABEL WITH ADHESIVE AND SILICONE-FREE RELEASE COATING

(71) Applicant: Iconex LLC, Duluth, GA (US)

(72) Inventors: Martha Patricia Wild, Duluth, GA (US); Marcus Eugene Wilker, Morristown, TN (US); Tuan Anh Nguyen Le, Marietta, GA (US); Jessica Darlene Watkins, White Pine, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 16/721,585

(22) Filed: Dec. 19, 2019

(65) Prior Publication Data

US 2020/0157389 A1 May 21, 2020

Related U.S. Application Data

(63) Continuation of application No. 14/305,911, filed on Jun. 16, 2014, now Pat. No. 10,550,293, which is a continuation-in-part of application No. 14/192,997, filed on Feb. 18, 2014, now Pat. No. 9,495,888.

(60) Provisional application No. 61/914,213, filed on Dec. 10, 2013.

(51) Int. Cl.
| | | |
|---|---|---|
| *B32B 43/00* | (2006.01) | |
| *C09J 103/02* | (2006.01) | |
| *C09J 7/38* | (2018.01) | |
| *B32B 37/12* | (2006.01) | |
| *B32B 37/00* | (2006.01) | |
| *B32B 38/10* | (2006.01) | |
| *C09J 11/02* | (2006.01) | |

(52) U.S. Cl.
CPC .............. *C09J 103/02* (2013.01); *C09J 7/38* (2018.01); *B32B 37/0038* (2013.01); *B32B 37/0084* (2013.01); *B32B 37/1284* (2013.01); *B32B 38/10* (2013.01); *B32B 43/006* (2013.01); *B32B 2037/1276* (2013.01); *C09J 11/02* (2013.01); *C09J 2203/334* (2013.01); *C09J 2301/412* (2020.08); *Y10T 156/11* (2015.01); *Y10T 156/19* (2015.01); *Y10T 428/28* (2015.01); *Y10T 428/2839* (2015.01)

(58) Field of Classification Search
CPC ............ B32B 37/0038; B32B 37/0084; B32B 2037/1276; B32B 37/268; B32B 38/10; B32B 43/006; C09J 7/38; C09J 11/02; Y10T 156/11; Y10T 156/19

See application file for complete search history.

(56) References Cited

U.S. PATENT DOCUMENTS

| | | |
|---|---|---|
| 3,690,924 A | 9/1972 | Estes |
| 4,021,365 A | 5/1977 | Sinka et al. |
| 4,624,893 A | 11/1986 | Shibano et al. |
| 5,102,733 A | 4/1992 | Zawadzki |
| 5,672,428 A | 9/1997 | Muschelweicz et al. |
| 5,824,748 A | 10/1998 | Kesti et al. |
| 5,877,252 A | 3/1999 | Tsujimoto et al. |

(Continued)

*Primary Examiner* — Mark A Osele
*Assistant Examiner* — Nickolas R Harm
(74) *Attorney, Agent, or Firm* — Schwegman Lundberg & Woessner, P.A.

(57) ABSTRACT

A label having a silicone-free (water-based) release coating and compatible adhesive patch is provided. The label includes a thermally coated substrate having a silicone-free substrate overlaid thereon of a first surface. A second surface includes a microsphere adhesive layer.

12 Claims, 12 Drawing Sheets

(56) References Cited

U.S. PATENT DOCUMENTS

| | | | |
|---|---|---|---|
| 6,074,747 A | 6/2000 | Scholz et al. | |
| 6,432,528 B1 * | 8/2002 | Faust | B65C 9/46 |
| | | | 428/354 |
| 6,472,468 B1 | 10/2002 | Omura et al. | |
| 6,613,430 B2 | 9/2003 | Culbertson et al. | |
| 7,329,449 B2 | 2/2008 | Wiklof et al. | |
| 7,411,020 B2 | 8/2008 | Carlson et al. | |
| 8,147,643 B1 | 4/2012 | Valenti, Jr. et al. | |
| 8,445,104 B2 | 5/2013 | Vigunas et al. | |
| 9,495,888 B2 | 11/2016 | Wild | |
| 2002/0058458 A1 | 5/2002 | Lee et al. | |
| 2002/0079121 A1 | 6/2002 | Ryan et al. | |
| 2002/0136912 A1 | 9/2002 | Irick, Jr. | |
| 2003/0077427 A1 | 4/2003 | Cates et al. | |
| 2003/0109630 A1 | 6/2003 | Smith et al. | |
| 2005/0255298 A1 | 11/2005 | Crum | |
| 2006/0141194 A1 | 6/2006 | Carlson et al. | |
| 2007/0059472 A1 | 3/2007 | Kitchin | |
| 2007/0267146 A1 | 11/2007 | Vigunas et al. | |
| 2008/0118694 A1 | 5/2008 | Crum | |
| 2009/0020245 A1 | 1/2009 | Garcia Juez et al. | |
| 2010/0300613 A1 | 12/2010 | Stogbauer et al. | |
| 2011/0160376 A1 | 6/2011 | Hori et al. | |
| 2013/0260991 A1 | 10/2013 | Van Boom et al. | |
| 2015/0159034 A1 | 6/2015 | Wild et al. | |
| 2015/0159054 A1 | 6/2015 | Wild et al. | |
| 2015/0161915 A1 | 6/2015 | Wild | |
| 2015/0161916 A1 | 6/2015 | Wild et al. | |

* cited by examiner

POROSITY AND CALIPER OF PAPER SUBSTRATES TESTED

| | KL370NCR POROSITY | | APP L077-02 POROSITY | | MITSUBISHI TF 8067 POROSITY | | RICOH N150 LA-2 POROSITY | |
|---|---|---|---|---|---|---|---|---|
| | COATED | UNCOATED | COATED | UNCOATED | COATED | UNCOATED | COATED | UNCOATED |
| AVERAGE | 26.9 | 610.3 | 32.5 | 345.8 | 40.0 | 313.3 | 26.8 | 399.8 |
| ST. DEV. | 6.60 | 44.74 | 3.97 | 23.66 | 3.07 | 28.61 | 2.72 | 13.47 |

| | KL370NCR PPS ROUGHNESS | | APP L077-02 PPS ROUGHNESS | | MITSUBISHI TF 8067 PPS ROUGHNESS | | RICOH N150 LA-2 PPS ROUGHNESS | |
|---|---|---|---|---|---|---|---|---|
| | COATED | UNCOATED | COATED | UNCOATED | COATED | UNCOATED | COATED | UNCOATED |
| AVERAGE | 1.2 | 5.0 | 1.5 | 3.9 | 1.6 | 3.7 | 1.3 | 3.9 |
| ST. DEV. | 0.04 | 0.32 | 0.04 | 0.08 | 0.06 | 0.08 | 0.02 | 0.11 |

Fig. 1D

SAMPLE SPECIFICATIONS FOR WATER BASED RELEASE COATING AND COMPATIBLE ADHESIVE FORMULATION

| TEMPERATURE, SOLIDS, VISCOSITY AND COAT WEIGHTS FOR RELEASE COATING AND ADHESIVE SR REPOSITIONABLE MICROSPHERES | | | | | | | |
|---|---|---|---|---|---|---|---|
| | DRYER TEMPERATURE SPEED/TIME | TEMPERATURE ENTERING DRYER #1 | TEMPERATURE EXITING DRYER #1 | TEMPERATURE ENTERING DRYER #2 | TEMPERATURE EXITING DRYER #2 | SOLIDS (%) | VISCOSITY (CPS) | COAT WEIGHT (GSM) |
| NCR RELEASE COATING TARGET | 300F @ 350 FPM/7 SEC | 76 | 153 | 97 | 155 | 35 | 2625 @ 10 RPM, 24C, SPINDLE #4 | 1.7 |
| NCR RELEASE COATING TARGET | | 70-80 | 140-175 | 90-105 | 130-170 | 32-37 | 2200-3000 | 0.9-2 |
| ADHESIVE STANDARD REGISTER 2A-191 – TARGET | 310F @ 350 FPM/3.5 SEC | 86 | 143 | 91 | 125 | 40 | 1625 @ 10 RPM, 24C, SPINDLE #4 | 9 |
| ADHESIVE STANDARD REGISTER 2A-191 – RANGE | | 84-89 | 125-165 | 85-100 | 100-145 | 40 | 1300-1800 | 7-11 |

*Fig. 1E*

RELEASE OFF PRESS FROM ROLL

| RELEASE FROM THE COATED PAPER OFF THE PRESS (LBF) ADHESIVE SR MICROSPHERES (T2014040) || RELEASE FROM ROLL (LBF) ADHESIVE SR MICROSPHERES (T040/T038) ||
|---|---|---|---|
| MAX | AVERAGE | 40 MM | 80 MM |
| 0.015 | 0.013 | 0.15 | 0.21 |

*Fig. 1F*

PEEL FORCE 80 MM STICKY MEDIA

| T2014040 C2B-SRLP | STAINLESS STEEL 180 DEGREE 10 MIN WAIT AT ROOM TEMPERATURE | | US MCD YELLOW WRAP T-PEEL | | | | RELEASE FROM ROLL | |
|---|---|---|---|---|---|---|---|---|
| | | | PRINTED SIDE | | UNPRINTED SIDE | | | |
| | MAX | AVERAGE | MAX | AVERAGE | MAX | AVERAGE | MAX | AVERAGE |
| AVERAGE | 0.10 | 0.09 | 0.25 | 0.23 | 0.08 | 0.07 | 0.35 | 0.33 |
| LOWER LIMIT | 0.09 | 0.08 | 0.24 | 0.22 | 0.07 | 0.06 | 0.30 | 0.28 |
| UPPER LIMIT | 0.11 | 0.10 | 0.26 | 0.23 | 0.09 | 0.08 | 0.40 | 0.38 |

Fig. 1G

PEEL FORCE 40 MM STICKY MEDIA

| T2014038 C2B-SRLP | STAINLESS STEEL 180 DEGREE 10 MIN WAIT AT ROOM TEMPERATURE | | US MCD YELLOW WRAP T-PEEL | | | | RELEASE FROM ROLL | | McCAFE STYROFOAM CUP | | McCAFE PLASTIC CUP | |
|---|---|---|---|---|---|---|---|---|---|---|---|---|
| | | | PRINTED SIDE | | UNPRINTED SIDE | | | | | | | |
| | MAX | AVERAGE | MAX | AVERAGE | MAX | AVERAGE | MAX | AVERAGE | MAX | AVERAGE | MAX | AVERAGE |
| AVERAGE | 0.036 | 0.033 | 0.153 | 0.135 | 0.042 | 0.037 | 0.122 | 0.117 | 0.211 | 0.183 | 0.056 | 0.053 |
| LOWER LIMIT | 0.032 | 0.03 | 0.147 | 0.133 | 0.034 | 0.034 | 0.113 | 0.111 | 0.2 | 0.173 | 0.046 | 0.04 |
| UPPER LIMIT | 0.039 | 0.035 | 0.162 | 0.136 | 0.051 | 0.043 | 0.135 | 0.127 | 0.22 | 0.193 | 0.065 | 0.06 |

```
        FAST FOOD RESTAURANT
                                202

ITEMS:

HAMBURGER              $2.90
LARGE FRIES            $0.99
SMALL MILKSHAKE        $0.99

TOTAL:         $4.88
        CASH:          $5.00
        CHANGE:        $0.12
```

LABEL WITH ADHESIVE AND SILICONE-FREE RELEASE COATING

RELATED APPLICATIONS

The present application is a continuation of U.S. patent application Ser. No. 14/305,911, filed on Jun. 16, 2014, which is co-pending with, claims priority to, and is a Continuation-In Part of U.S. Ser. No. 14/192,997, entitled "Adhesive Label with Water-Based Release Coating," filed on Feb. 28, 2014, which claims priority to U.S. Provisional Application No. 61/914,213, entitled "Adhesive Label with Water-Based. Release Coating," filed on Dec. 10, 2013; the disclosure of both are incorporated by reference in their entireties herein.

BACKGROUND

The ubiquitous adhesive label is available in a myriad of configurations for use in various applications, including specialty applications. The typical an adhesive label includes pressure-sensitive adhesive on its back side and initially laminated to an underlying release liner.

Adhesive labels may be found in individual sheets, or joined together in a fan-fold stack, or in a continuous roll. Label rolls are typically used in commercial applications requiring high volume use of labels.

One type of label roll may be in the form of a web and does not include a liner sheet. Such label rolls are known as linerless label rolls. The labels may be formed of thermal paper for sequential printing of individual labels in a direct thermal printer. Or, a thermal transfer printer may also be used. The front surface of the label web may be coated with a release coating. In the fast food industry, linerless labels may be used in identifying individual food products in typical sales transactions.

A preferred release coating for use with all types of adhesive labels is silicone. However, silicone is perceived to be environmentally unfriendly.

Moreover, the standard adhesive used for silicone tends to be too tacky and causes blocking or picking with non-silicone release coatings. Further, high-tack adhesives can cause print jams or even stop printing all together. Adhesives, if not properly formulated, can also include chemicals that can image any thermal print layer on a label when those adhesives come into contact with the thermal print layer. Still further, if the adhesive is too similar to the release layer, the adhesive film can spilt and adhere to the thermal print layer. So, the adhesive needs a strong bonding capability to prevent adhesive film splitting.

Therefore, it would be desirable to provide a label having a silicone-free release layer with a strong-bonding adhesive that does not adversely impact printers that image the label.

SUMMARY

In various embodiments, a label with a water-based release coating and adhesive path and methods of applying the adhesive patch are provided.

An example label includes a substrate and a water-based release coating applied to a first surface of the substrate as a mixture, the mixture including: a formulation of a fluorochemical, a starch, a defoamer, a cross linker, a release agent, and a catalyst.

The substrate can be paper, such as a base paper, a single layer coated paper, a several layer coated paper, a thermal coated paper, a top coated paper (over the thermal coating), film, or any other substrate that can receive coated layers.

DETAILED DESCRIPTION

As will be described more completely herein and below, the labels with water-based release (water-based and environmentally-friendly) coatings and pressure sensitive adhesive patches improve paper feeds for printers and other performance and processing properties for thermal-printed, labels, linerless labels, and related products.

Silicone-Free Water-Based Release Coating

The release coating presented herein is a formulation having of optimized mixture having various components, which work with the water-based adhesives to achieve the desired properties of a final label. Such formulation has low release from the roll and the high peel force from the substrate, and it has a minimal negative impact on the thermal print quality of the label when printed.

This non-silicone release coating (water-based release coating) may be used in combination with various adhesive patterns including a single line of adhesive patches on one side of the back of the label as well as any other combination or orientation of small or large adhesive patches of any of numerous possible designs.

The formulated mixture includes an optimized water-based combination of starch, defoamer, cross linker, fluorochemical, a non-silicone release agent, and a catalyst that functions with a chosen water-based adhesive to produce a liner-less label product, which releases well from itself and adheres well to a wide range of substrates. This combination achieves a low release force when peeling from the roll but a high peel force when peeling from the substrates to which it is attached. The label is repositionable meaning it can be removed from the substrate and re-attached to it or to another substrate.

The materials are chosen not only to achieve the desired label properties but also to ensure the consistent manufacturability of the product. The viscosity of the material applied to the thermal paper has to be within a specified range. The materials were chosen to achieve this range.

In an embodiment, the starch is selected is supplied by Penford under the chemical name as PenCote L1000, which functions as Starch L-1000. The starch is approximately 53.62% of the dry weight for the total dry weight for the mixture and approximately 35.87% of the wet weight for the total wet weight of the mixture. The cross linker is supplied by Omnova under the chemical name Aquarez 755 and is approximately 4.02% of the dry weight for the total dry weight for the mixture and approximately 2.45% of the total wet weight of the mixture. The fluorochemical is supplied by Daikin under the chemical name Unidyne TG8151 and is approximately 21.45% of the dry weight for the total dry weight for the mixture and approximately 35.87% of the total weight of the mixture. The defoamer is supplied by BASF under the chemical name Afranil F and is approximately 1.61% of the total dry weight for the mixture and approximately 2.69% of the total wet weight for the mixture. The non-silicone release agent is supplied by Sustainable Fiber Solutions and is approximately 17.37% of the total dry weight for the mixture and approximately 2.39% of the total wet weight for the mixture. In an embodiment, the catalyst is supplied by Sustainable Fiber Solutions and is approximately 1.93% of the total dry weight for the mixture and approximately 1.61% of total wet weight for the mixture.

In an embodiment, the starch component is a dry starch such as Pencote D HV that increases the shelf-life of the release coating.

Moreover, in an embodiment, when the release coating is applied at a size press of a paper machine or a dryer, the viscosity of the release coating is reduced (such as by at least one order of magnitude) depending on the desired application. In such a case, the starch component (in addition to any binder component) is a rheology modifier for the release coating.

The starch increases the viscosity of the release coating due to its high viscosity and the viscosity permits the release coating to run well in the press. Therefore, in an embodiment, different lower viscosity starches are used for each different application based on the specific equipment and that equipment's metrics, configuration, and requirements. So, the viscosity is adjustable based on the equipment applying the novel release coating by selecting different viscosity starches for the release coating formulation.

The release coating formulations provided herein are and provide: a non-silicone release coating; formulated in combination with water-based adhesive (as discussed below); sticks to a wide variety of substrates; labels that are easily peeled from a roll; the labels are repositionable; the labels do not fall off during packaging; print quality from such labels is of a high and consistent quality; and there is little build-up in thermal printers that print the labels on the print heads and cutters, which maximizes the lives of the printers.

In an embodiment, the phrases "silicone-free" and "non-silicone" are intended to mean "substantially free of silicone." That is, any formulation having approximately 5% or less of silicone is considered to be "silicone-free" or a "non-silicone" formulation for the release coating.

Repositionable Microsphere Adhesive for Silicone-Free (Water-based) Release Coating In an embodiment, a repositionable low-tack adhesive is used. The adhesive may include microspheres, or could be both repositionable and include microspheres. This low tack adhesive can be applied by itself with different adhesive patches or in combination with a high-tack adhesive. In addition a third component could be added to the blend of adhesives. The third component is a rheology modifier, such as a thickener that is compatible with both adhesives. This rheology modifier is additive. That is, even if added to each component separately, it still modifies the final adhesive blend when added to the mixture of both adhesives.

Figure 1A:
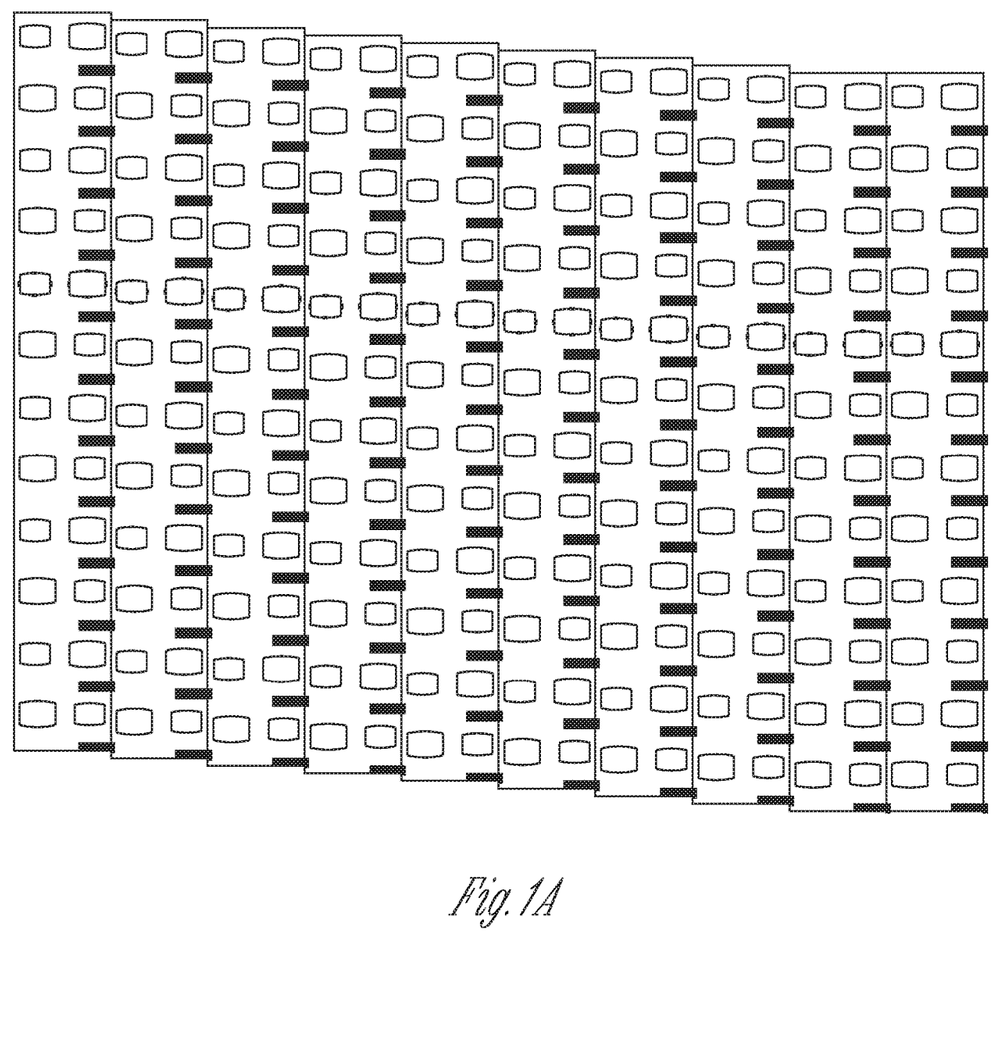
FIG. 1A is a diagram depicting example adhesive patches on left and right sides of a sample receipt label, according to an example embodiment.
Figure 1B:
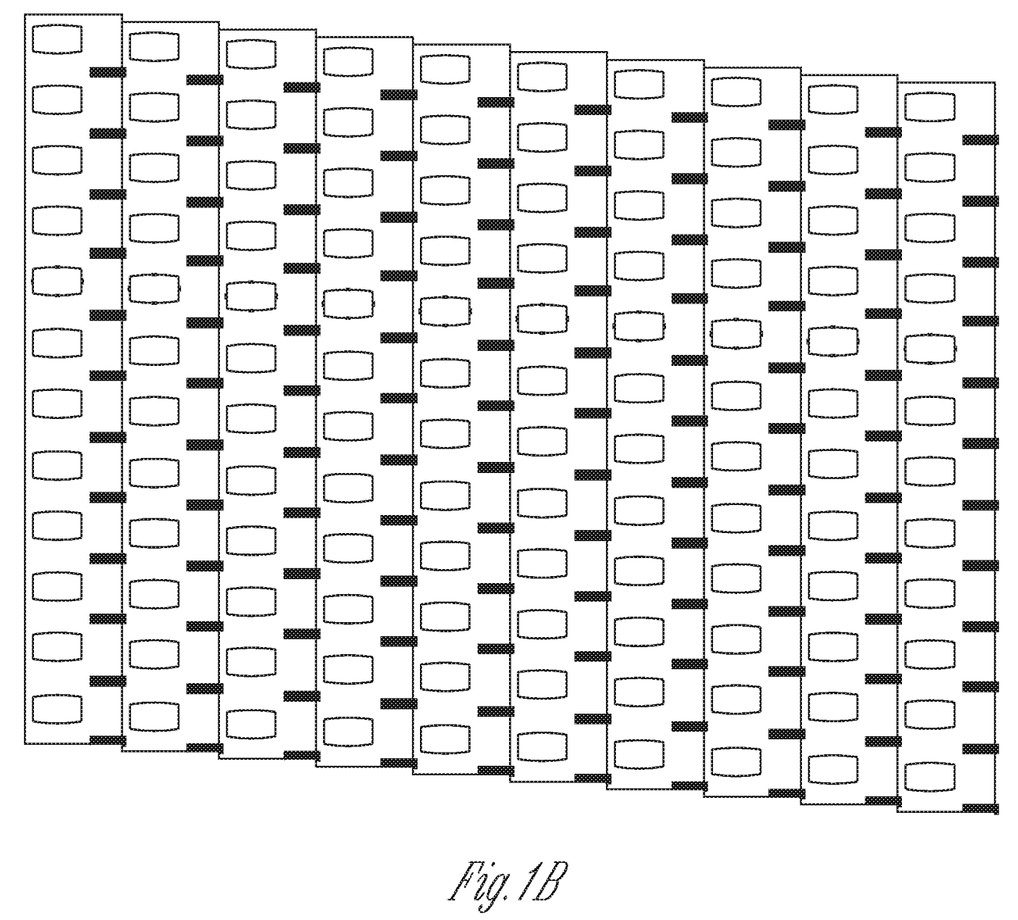
FIG. 1B is a diagram depicting example adhesive patches on one side of a sample receipt label, according to an example embodiment.

During trials, in spite of relative low tack when tested on stainless steel, the adhesive adheres very well to the many different substrates for both the grill and beverage industries. Moreover, some patches enhance the performance of the adhesive (examples of these are given in the FIGS. 1A and 1B).

In an embodiment, the adhesive is applied on a Flexographic press with anilox rolls. Depending on the degree of tack needed for the different applications, the press has the flexibility of a two bump application where one adhesive patch is printed on one printing station and a second bump is printed on the second printing station. Since the second adhesive patch is printed in the same exact location as the first patch, registration is of import. The microspheres tend to be almost transparent and hard to see when the press is running at 350 fpm. To facilitate registration, small lines are printed when printing the sense marks. The lines fit the contour of selected adhesive patches. In addition, an optical brightening agent or dye can be added to the adhesive or blend of adhesives to make the adhesive more distinct.

Figure 1C:
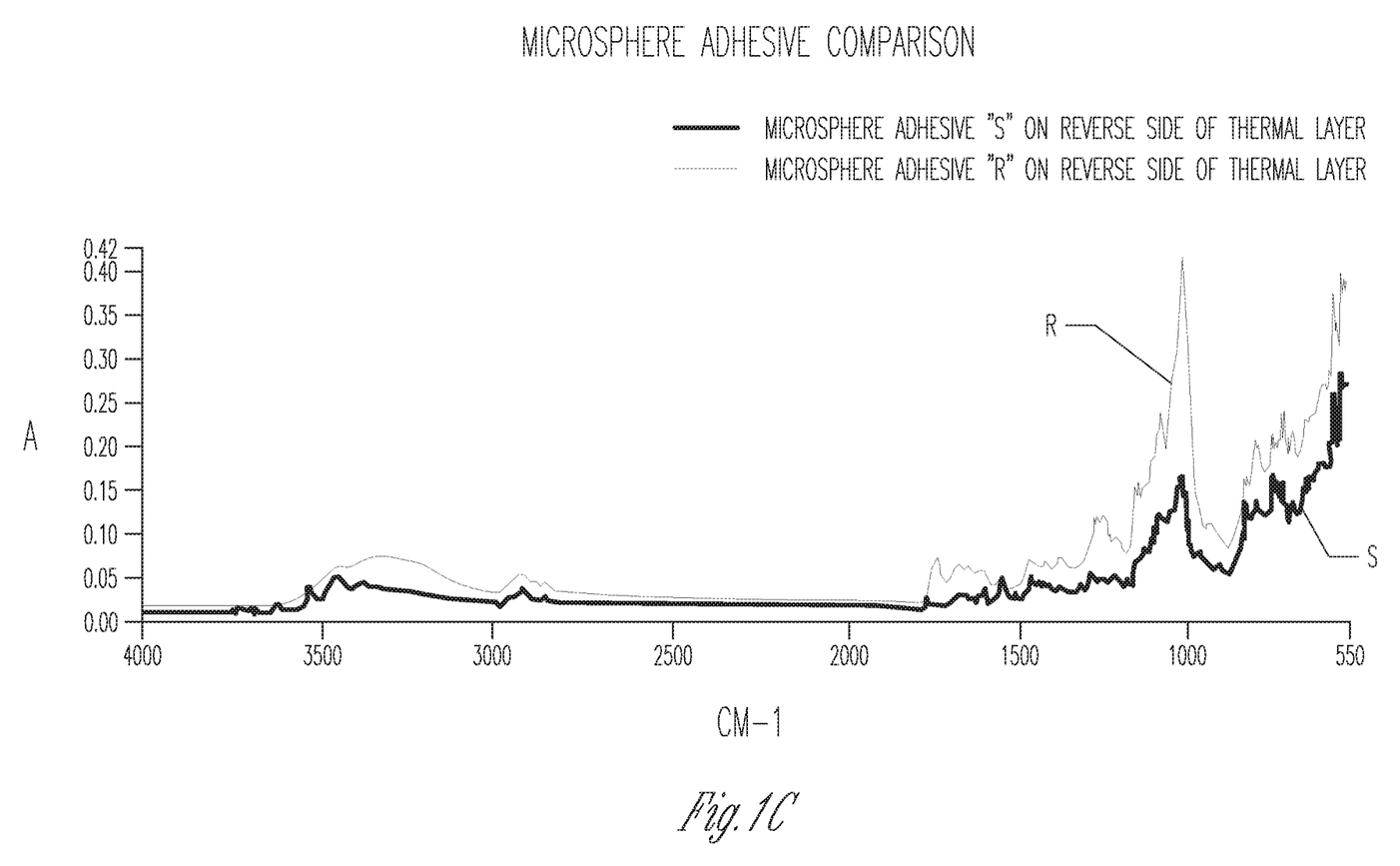
FIG. 1C is a diagram depicting a comparison between two different microsphere adhesives, according to an example embodiment.

Low-tack adhesives have very low solids content and low viscosity, which is not the recommended rheology for a Flexo press. So, in an embodiment extreme driers (placed at each station) are used to remove the large amount of water (65% to 70%) from the adhesive in a relative amount of time. This prevents the water from the adhesive from breaking the release coating layer and penetrating through the thermal or back coat. To do this, the adhesive is dried rapidly at 300 F for 80 mm wide roll and 310 F for 40 mm wide roll. Normally, a chiller roll is used in between the two adhesive stations to cool down the paper to prevent imaging. However, since the adhesive has a high concentration of water, there is no need to use the chiller roll. This is easier with thermal paper that can withstand high temperature. A FTIR (Fourier Transform Infrared) spectra of two microsphere adhesives "R" and "S" can be seen in the FIG. 1C. Although both of them appear to have similar peaks, adhesive "S" works better with the non-silicone release coating.

Customers want a silicone free product that is environmentally friendly. Silicone is known to be very sturdy, but at the same time brittle. Because of this sturdiness and water proof surface, the print quality tends to suffer, but high tack adhesive can be used. The adhesive presented is a silicone free (water-based) product.

Moreover, the adhesive presented is compatible with the release coating presented above and:
1. is compatible with the coating;
2. has strong bonding to prevent film splitting;
3. cleans the thermal printer by removing debris deposits;
4. does not jam the thermal printers;
5. sticks well to the substrates in spite of its very low tack;
6. is repositionable;
7. does not block or pick when in contact with the release coating;
8. is water based, but the coating process is been modified to dry the adhesive fast;
9. can be printed rather than coated;

10. can have a modified rheology for use in a Flexo printer;
11. reduces by chemical and mechanical means The novel adhesive includes microspheres. In addition, its tack, rheology, and color can be modified with chemicals, such as rheology modifiers, optical brightening agents, runnability enablers, such as defoamers. In addition to chemical modification, there are also mechanical modifications, such as running the driers without chiller rolls, adding fans after the driers to circulate the air and prevent puckering. The tension roll of the winder can be slightly loosened to prevent imprinting of the adhesive upper edge, which could eventually break the coating and cause blocking.

In an embodiment, the rheology of the adhesive is modified to make it similar to the rheology of the ink to print on a Flexo press. This is particularly difficult due to the high water content and low viscosity of the adhesive.

The selected microsphere adhesive has at least two requirements. One is that no matter what is added to the adhesive, the bonding of all the chemicals has to be strong enough to ensure integrity of the adhesive film. The second is that the adhesive should not be too similar to the release coating, because this will cause the film to split and to adhere not only to the back coat, but also to the release coating. In this instance, one of the coating's components is a starch, which could be used also as an adhesive. It is noted that certain microspheres tend to bond to the release coating that contains the starch forming bonds with the release coating and splitting the film or blocking.

This ensures that the selected microsphere adhesive (used in the adhesive formulation) is compatible with the new and novel silicone free (water-based) release coating presented above. Normally, high tack adhesives are used with silicone and the adhesive coat weight is around 16 gsm, however, with the microsphere adhesive the coat weight is around 9 gsm. The tack obtained with this adhesive is 2 orders of magnitude lower than the standard linerless product. However, the product adheres well to the substrates and other surfaces, such as cups, etc.

The formulated adhesive has: good adhesion, dries quick enough to reduce the tendency of the underlying paper to wrinkle, works with lower caliper (thinner) papers, does not pre-activate any thermally active coating of the paper (or other substrate), and inhibits printer-feed problems. Further, the formulated adhesive can be wound into roll form without the adhesive penetrating the smooth coating of the opposing surface and causing surface damage (i.e. picking) when the roll is unwound. This is a difficult set of performance criteria to meet and prior efforts in the industry using an adhesive with microspheres gave non-uniform coat weights, splattering of the adhesive, low peel forces, and failure of the paper feed apparatus (jamming) when the initial adhesion strength (tack) was increased (elevated viscosity improves tack). Further, the prior attempted adhesives contained selected microspheres that tend to gel rapidly when the adhesive exceeds some upper viscosity level, which rendered those adhesives impractical from a production standpoint. Conversely, too low a viscosity for the adhesive will prevent successful printing by the flexographic technique.

Linerless Thermal Label

A linerless thermal label is presented that includes: thermal paper with different activation temperatures; a repositionable microsphere adhesive (as presented above and, perhaps, designed in patches to provide better adhesion to different substrates); and a water based, and non-silicone release coating (as presented above, which is environmentally friendly). The label is manufactured and converted unconventionally on a printing press. The result is an environmentally friendly linerless label that (by way of example only):

1. is more resistant to: oil, heat, light and moisture resistant (especially when the high temperature thermal paper is used);
2. is cost effective to manufacture by:
    a. applying a new release coating (as discussed above) to a substrate that has no top coat (assuming the thermal paper has been applied uniformly);
    b. using a lower caliper paper (with the adequate stiffness), which can not only reduce the price of the linerless label, but can also increase the footage of the roll reducing the number of times the roll is changed;
    c. Lane coating the release coating formulation could half the cost of the coating—this will also help with the keeping the printer cleaner on the side where there is no adhesive;
3. is of enhanced print quality, such as by using a substrate with a glossier top coat that imparts much better bolder print quality;
4. has better cleaning capabilities, such as by using 2 different sized adhesive patches per inch (in between sense marks) on the left-hand side (LHS), the FIG. 1A, with a repositionable microsphere adhesive cleans both sides of the printer faster; when the adhesive is applied only on one side of the label (LHS), the printing on that side (LHS) has fewer missing characters (characters can disappear while printing a few receipts and then re-appear once the deposit on the print head has been cleaned by either the coating formulation or the adhesive;
5. includes a human factor aspect, such as by using 1 large adhesive patch that goes from one side of the receipt to the center line (FIG. 1B) that contributes to the human factor aspect, which is very important not only for corporate office but also for store operators; and the speed at which the orders have to be served in a fast food restaurant is what makes the linerless label so necessary to reduce the time of order processing; so, by adding the adhesive on just one side of the receipt label (FIG. 1B), operators can apply the label without their gloves sticking to the adhesive on the back of the receipt;
6. is unlike silicone because a pencil, pen, or marker can be used to write on the non-silicone release coating;
7. is the same coating formulation and adhesive can be used for a 80 MM, 40 MM or 58 MM width paper rolls; the novel label is silicone free and among other attributes it has good printability, cleans the print head of the thermal printer and restores missing characters.

So, the linerless label includes: high temperature paper, a new release coating formulation, and newly formulated adhesive applied in patches to maximize surface area and a repositionable microsphere adhesive that in spite of having low peel force when tested on stainless steel, it attaches well to a variety substrates.

Different thermal paper or film grades can be used to make the linerless labels described herein.

Figure 1D:
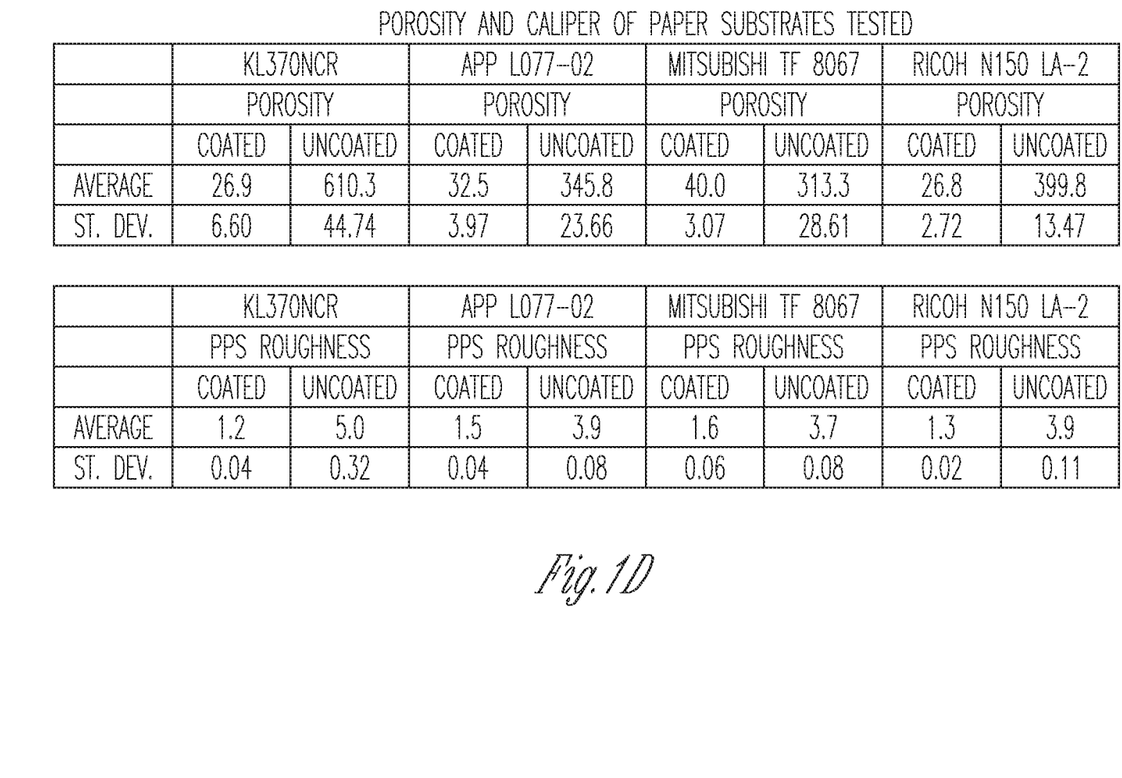
FIGS. 1D-1H are diagrams depicting example substrate testing results, according to an example embodiment.
Figure 1E:
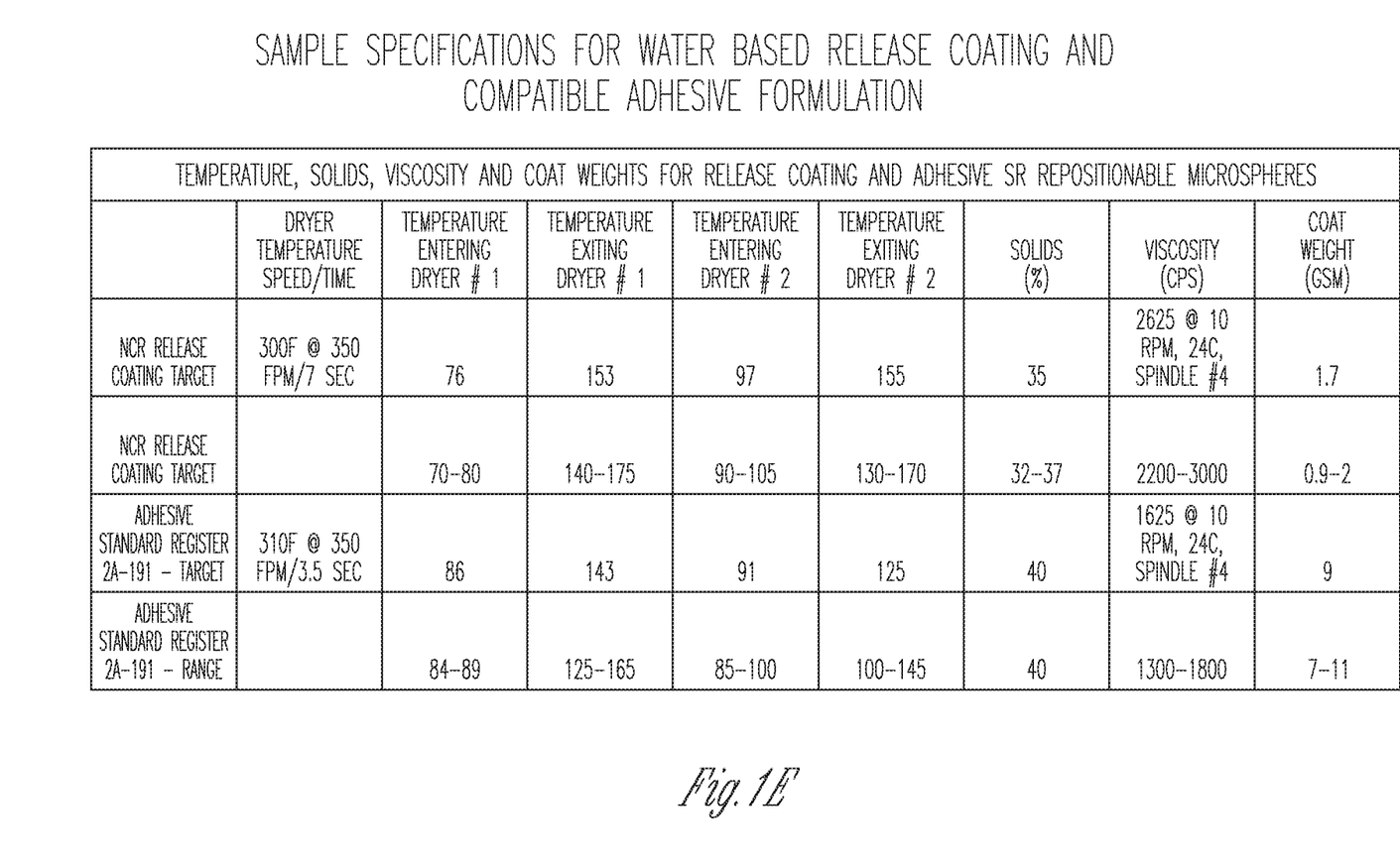
Figure 1F:
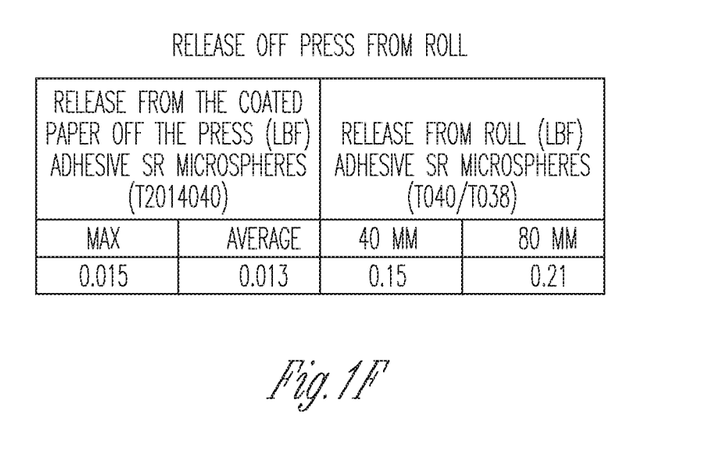
Figure 1G:
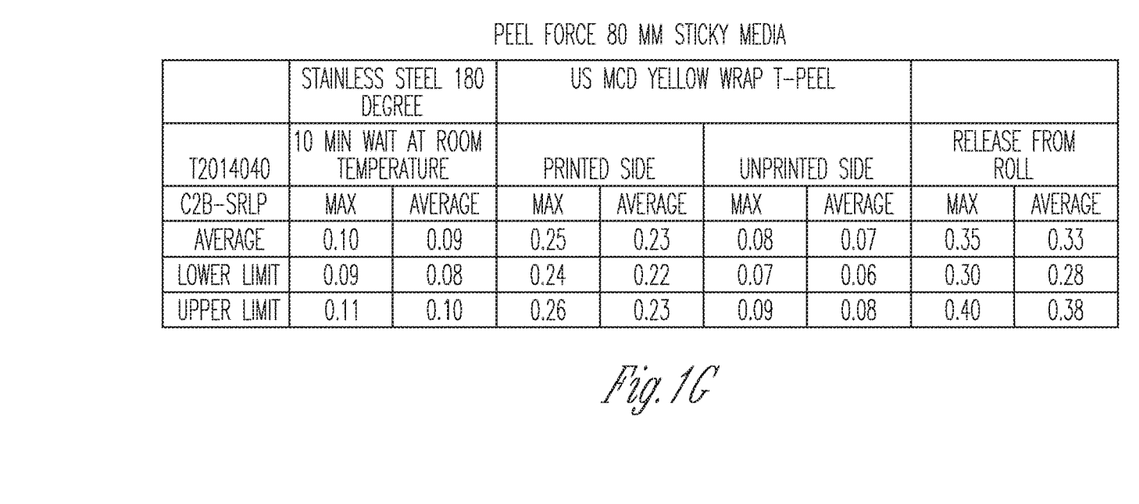
Figure 1H:
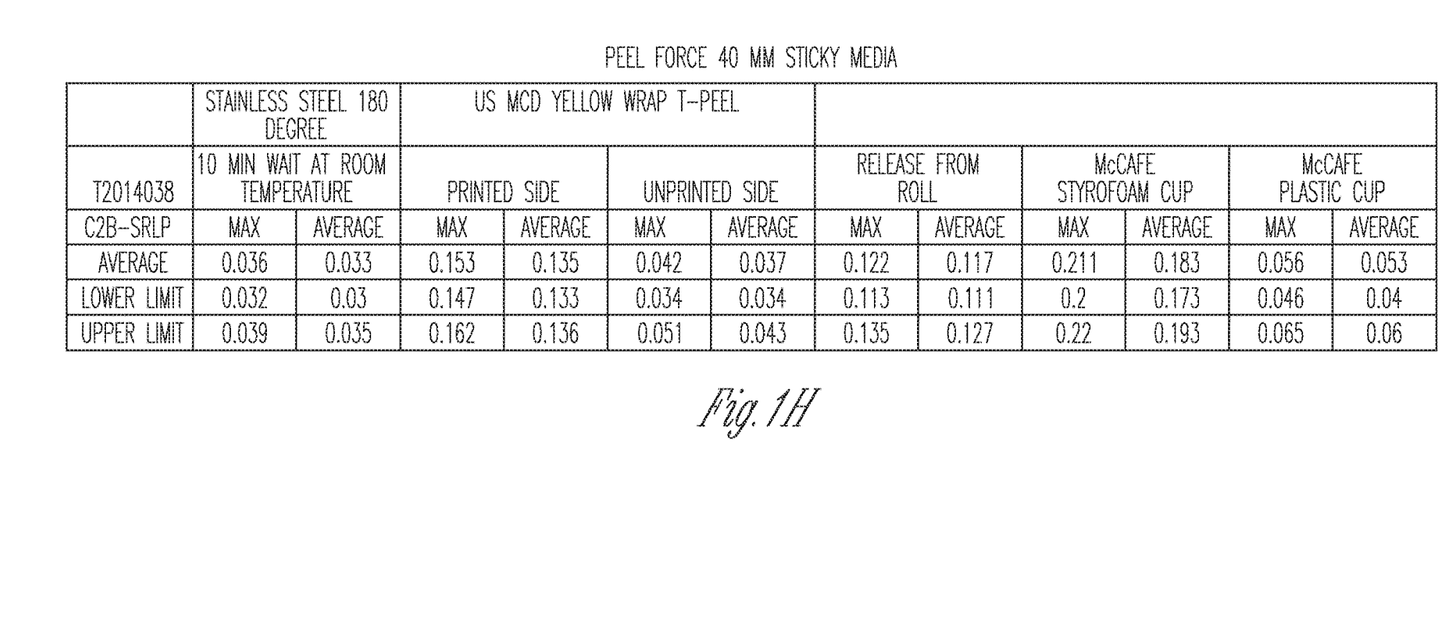

In trials four different substrates were tested and their physical properties are given in the FIG. 1D. The porosity and PPS smoothness are similar once the paper has been coated. These characteristics will ensure good adhesion of the release coating to the thermal paper or its top coat. The coat weight of the release liner will vary according to the substrate where the release coating is applied. One example of this application Is the high temperature thermal paper, which has an initial activation temperature of 248 F when the paper is dried. This allows the thermal paper to stand a dryer temperature of 300 F when the paper web is wet with the release coating. The release coating has low solids and relatively low viscosity, which requires more drying capacity. The paper is exposed to this temperature for 3.5 seconds in each of the dryers while traveling at a speed of 350 fpm. The paper cools down after exiting the dryer. The web heats up again upon entering the second dryer and cools down again. The coat weight is between 0.9 gsm to 2 gsm. Data is given in the FIG. 1E. The adhesive patches are then applied using the same dryers at the same speed. The adhesive is applied at each of the adhesive stations and the two extreme dryers are set at 310 F. The temperature is higher because the adhesive only has 1 dryer residence time (3.5 seconds) to dry enough the first adhesive patch before the second patch is applied. The second patch is applied at the second adhesive station and the second dryer dries the second adhesive patch. The extreme dryer has eight zones and each zone is set at 310 F. The FIG. 1E shows that even though the dryer is set at 310 F and initial activation starts at 248 F, the paper does not reach this temperature and therefore does not activate the thermal layer. Testing in the FIG. 1F shows low peel force, however for the microsphere adhesive the peel force either on stainless steel or on the substrate does not predict the strong adhesion of this adhesive to the customers' substrates. Release is one of the major parameters for the release coating. If the release is too high, it can cause blocking/ picking and the printer could be unable to unwind the roll to print. The release from the roll with the microsphere adhesive is given in the FIGS. 1G and 1H for two different substrates. When the paper is slit, if the tension in the winder is too high the top of the adhesive patch will make a dent on the release coating. If the dent is deep enough it can break the surface of the coating and cause blocking. Therefore, it is necessary to loosen the press and the slitter winders' tension to avoid blocking The novel label with water-based release coating and compatible adhesive formulation offers a complete linerless label solution having a substrate, release coating and adhesive. All these components work together well and can be manufactured using a printing press. The resulting label provides: printability, self-cleaning, avoids printer jamming, and offers a superior thermal print quality label for that which is available in the industry today. Moreover, the label is oil, moisture, light and heat resistant, and environmentally friendly.

Other embodiments of the invention are now discussed with reference to the FIGS. 2-7.

Figure 2:
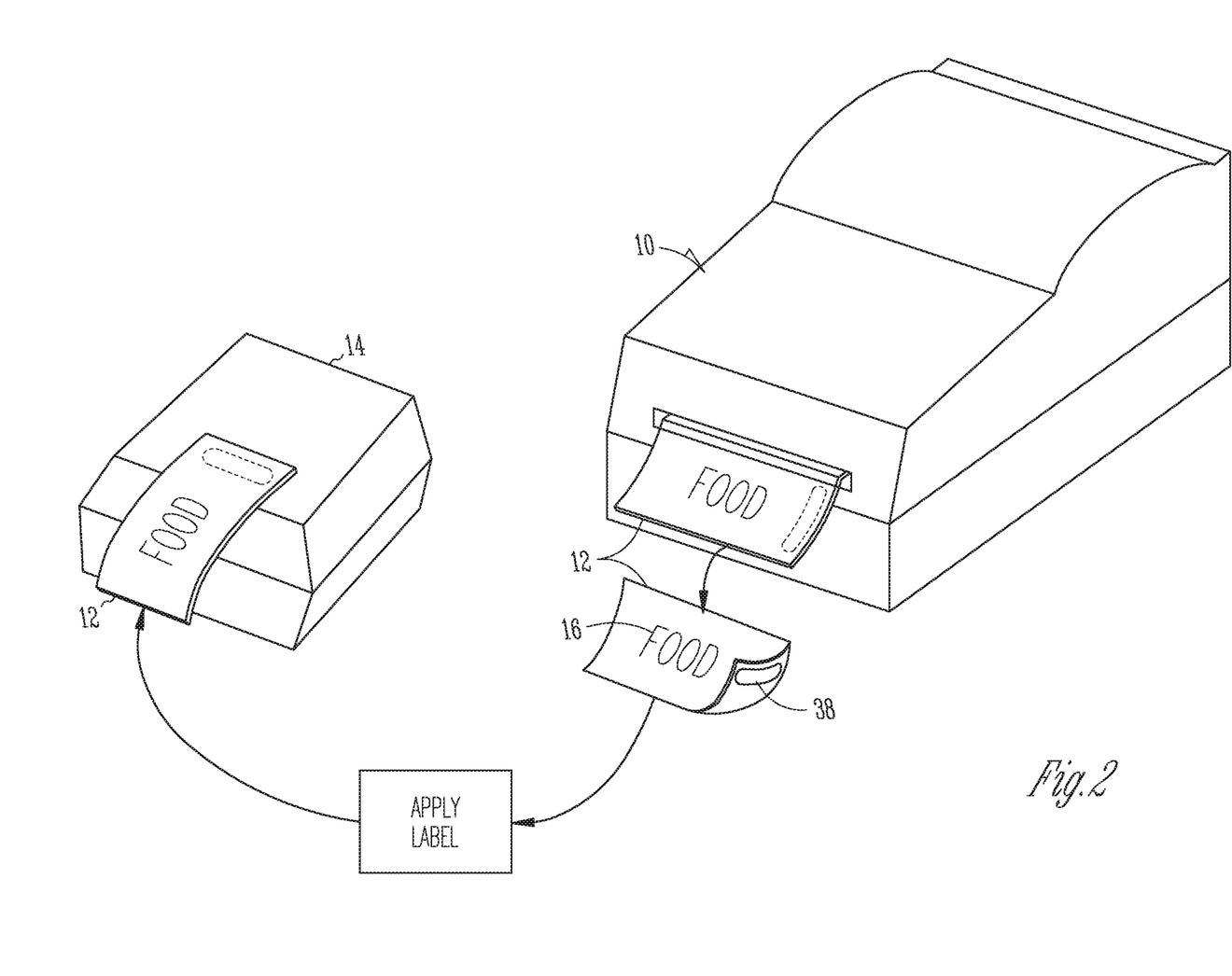
FIG. 2 is a view of a thermal printer dispensing pressure labels, according to an embodiment.

FIG. 2 is a view of a thermal printer dispensing pressure sensitive labels (having the release coating and adhesive formulation discussed above), according to an embodiment. With reference to FIG. 2, a printer 10 configured for printing in sequence individual labels 12 for use in a typical fast food application. For example, food may be placed in a suitable food package 14 such as the paper box illustrated, or simple wrapping paper. Printer 10 may include a thermal printer, such as a single or double-sided thermal printer (as shown in the FIG. 6).

Print or identifying indicia 16 is printed on a label 12 in printer 10 for identifying the contents of the package, for example. The individual printed label 12 may then be removed from printer 10 and applied using the adhesive mixture 38 to the food package 14 as illustrated in the a method (12 printed from 10 to 16 to APPLY LABEL to 12 applied to 14 using 38 (adhesive patch)), which is shown in FIG. 2.

Figure 3:
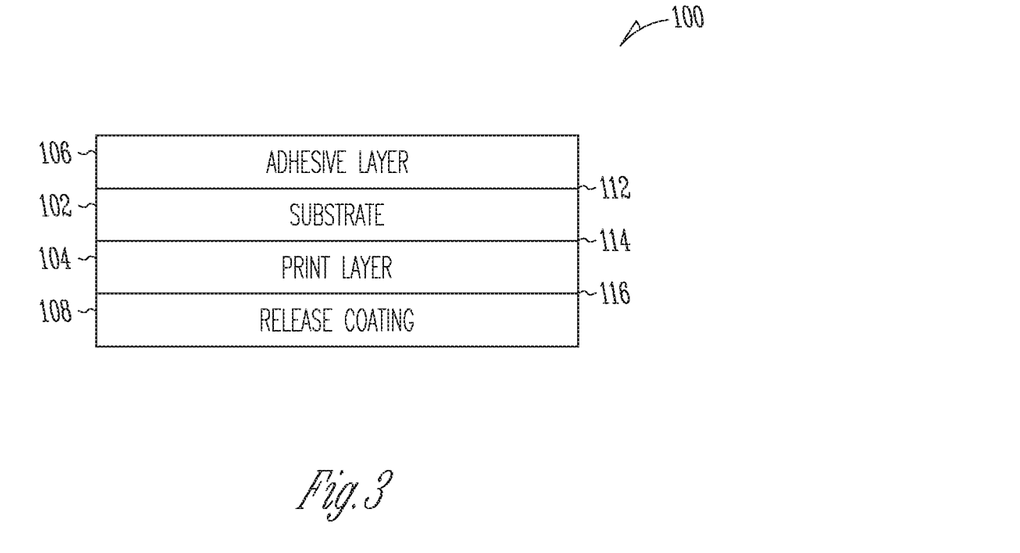
FIG. 3 is a cross-sectional view of a linerless label, according to an embodiment.
Figure 4:
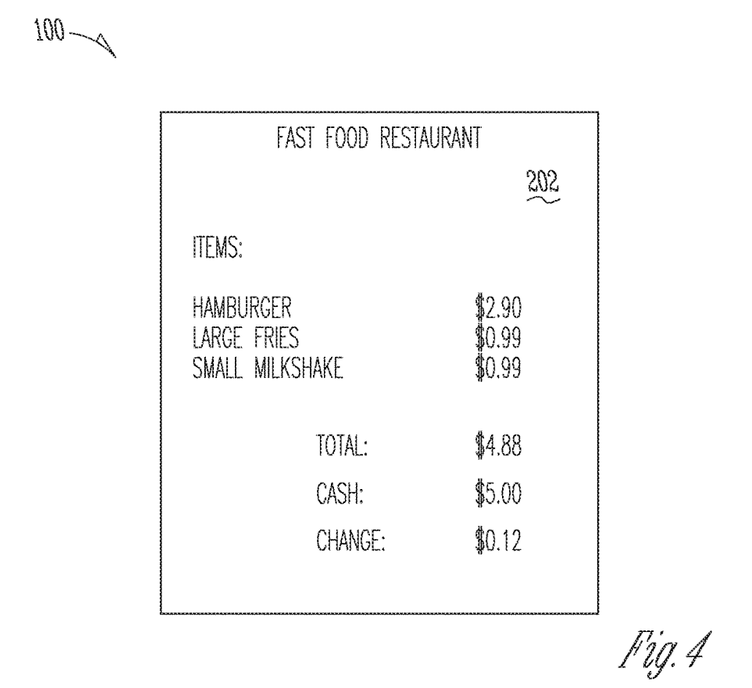
FIG. 4 is a view of a second surface of the linerless label of FIG. 3, including printed text, according to an embodiment.
Figure 5:
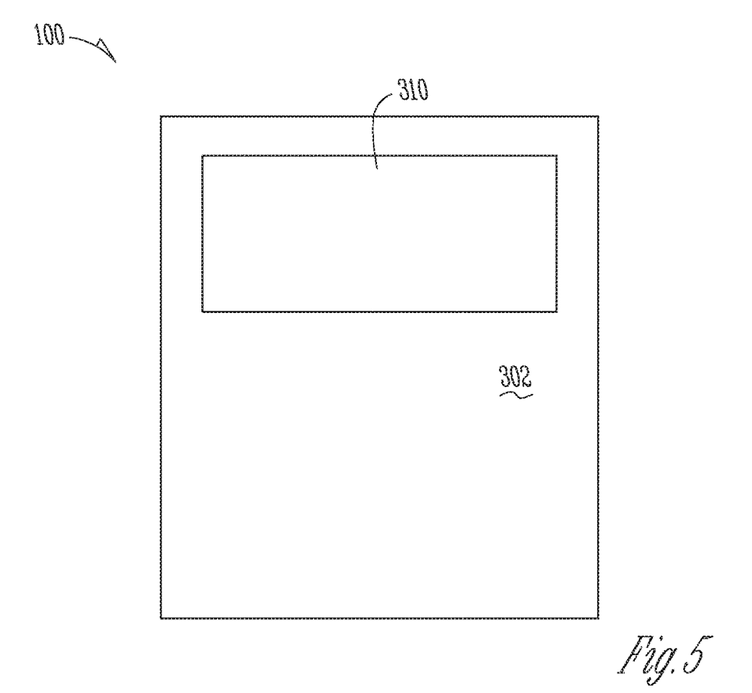
FIG. 5 is a view of a first surface of the linerless label of FIG. 3, including a strip of activated adhesive, according to an embodiment.

FIGS. 3-5 illustrate an example linerless label 100 that includes a printable surface including imaging material on one side and a heat-activated adhesive surface on the other side having a release coating, according to embodiments of the invention. It is to be noted that other types of labels are also envisioned.

FIG. 3 is a cross-sectional view of a linerless label having an adhesive patch, according to an embodiment.

With reference to FIG. 3, linerless label 100 is formed of layers including a substrate 102, a thermal print layer 104, a heat-activated adhesive layer 106 (having the adhesive formulation discussed above), and a release coating 108 (having the release coating formulation discussed above). The adhesive layer 106 overlies a first surface 112 of the substrate 102 and the print layer 104 overlies a second surface 114 of the substrate 102 of the print layer 104. The release coating 108 overlies surface 116 of the print layer 104. The adhesive layer 106 having an adhesive patch comprised of the adhesive mixture (with or without a thickener) as discussed in detail above.

In some embodiments, substrates may be thermally resistant in order to prevent heat applied to one side of the substrate from activating materials on the other side of the substrate.

Linerless label 100 may be wound into a roll. The adhesive layer 106 comes into contact with the release coating 108, thereby minimizing adhesion between the adhesive layer 106 and the print layer 104 or underlying substrate 102.

The print layer 104 can include one or more layers of thermal imaging material. For instance, the print layer 104 can include a thermal transfer receptive coating suitable for thermal transfer printing. Alternately or additionally, the print layer 104 may include one or more thermally sensitive coatings which are adapted to change color upon application of heat thereto by which direct thermal printing is provided.

The adhesive layer 106 may include water based adhesives and may be applied in patches (in any of the manners discussed above) using a printing press.

As an alternative to using a separate print layer 104, substrate 102 could comprise thermochromic paper. A thermal print head can print visible patterns on thermochromic paper without requiring an additional print layer to be formed on the substrate.

FIG. 4 is a view of a second surface of the linerless label of the FIG. 3, including an example printed or imaged text, according to an embodiment.

That is, FIG. 4 illustrates an example of a second surface 202 of the linerless label 100 after printing. In this example, the label 100 is a receipt for a fast food meal. As shown in FIG. 3, the second surface 202 of the linerless label 100 has been printed with transaction information by, for example, direct thermal printing of one or more thermally sensitive compounds in the print layer 104.

FIG. 5 is a view of a first surface of the linerless label of FIG. 3, including a strip of activated adhesive (having the adhesive mixture), according to an embodiment.

The first surface 302 includes a wet adhesive portion in the form of a tacky strip 310 of heat-activated adhesive material that has been activated by, for example, a thermal print head. In this example, the tacky strip 310 can be used to attach the receipt to an associated bag of food. Consequently, the bag and the receipt can be handed to a customer simultaneously.

The tacky strip 310 can be formed in one of at least two different methods. In the first method, the entire first surface 112 of the substrate 102 can be overlaid by a heat-activated adhesive that is dry and non-tacky prior to activation. Then, only a selected portion of the heat-activated adhesive, the portion defining the strip 310, is activated by heat applied with a thermal print head. Depending on the embodiment, such activation may occur at or substantially at the same time as, or at some time after the second surface 202 of the receipt has been printed with transaction information. In the second method, a portion of the first surface 302 defining the strip 310 can be overlaid with a heat-activated adhesive that is dry and non-tacky prior to use. The entire heat-activated adhesive can be activated by a thermal print head, which activation may, depending on the embodiment, occur at or substantially at the same time as, or at some time after the second surface 202 of the receipt has been printed with transaction information. Either manner will result in a tacky adhesive strip 310. When a double-sided thermal printer is used, a first thermal print head can print on the second surface 202 of the receipt while a second thermal print head activates the first surface 302 of the receipt.

The substrate can be paper, such as a base paper, a single layer coated paper, a several layer coated paper, a thermal coated paper, a top coated paper (over the thermal coating), film, or any other substrate that can receive coated layers.

Figure 6:
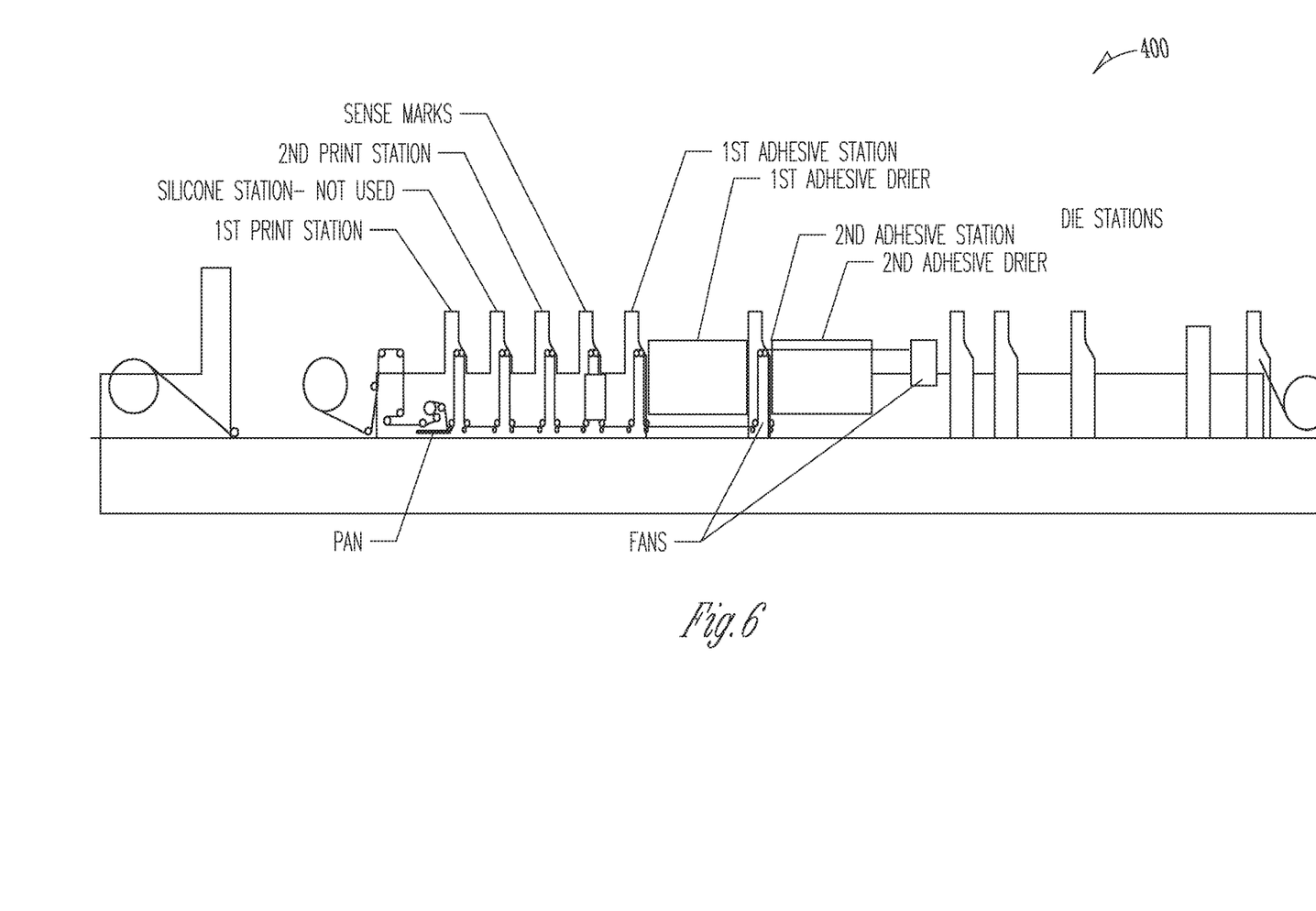
FIG. 6 is an example apparatus for applying release coatings and adhesive patches, according to an example embodiment.

FIG. 6 is an example apparatus for applying adhesive patches, according to an example embodiment.

An example press 400 is illustrated. The example press is a flexographic or "flexo" printing press.

Figure 7:
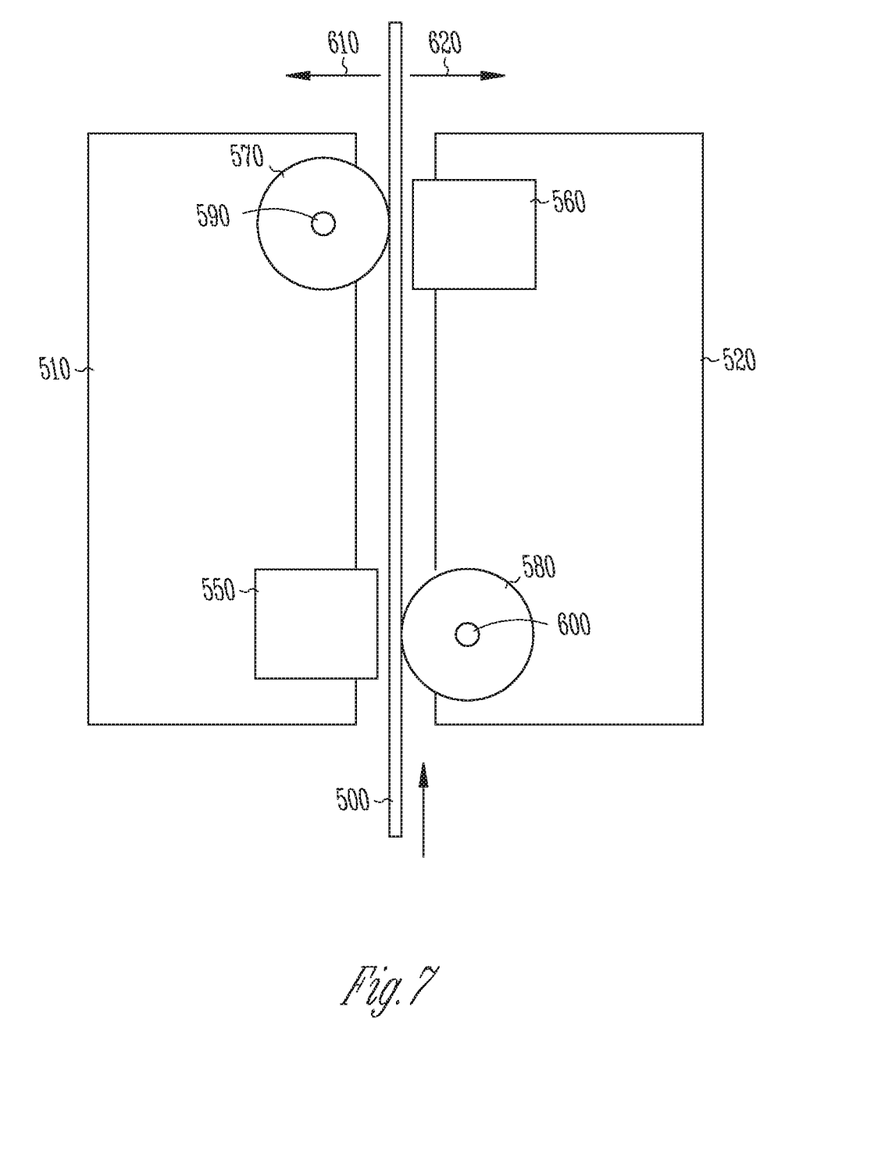
FIG. 7 is an example double-sided thermal printer for printing labels, according to an embodiment.

FIG. 7 is an example double-sided thermal printer for printing labels having an adhesive patch, according to an embodiment.

An example double-sided thermal printer includes a first print head assembly 510, a second print head assembly 520, and a motor. The first print head assembly 510 includes a first print head 550 and a first platen 570 rotatable about a first shaft 590. Similarly, the second print assembly 520 comprises a second print head 560 and a second platen 580 rotatable about a second shaft 600.

During operation of the double-sided thermal printer, the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the two sides of label 500 to perform printing operations. More particularly, first print head 550 performs printing operations on a side of label 500 indicated by an arrow 610 and second print head 560 performs printing operations a side of label 500 indicated by an arrow 620.

In an embodiment, when the applied adhesive is applied to the substrate it can be a pressure-sensitive adhesive. In such a case, pressure can be applied to the adhesive at a customer's location for the receipt to adhere to customer items, such as, but not limited to: paper/foil wraps, cardboard boxes, clam shells, fries sleeves, cups, etc.

Although the present invention has been described with particular reference to certain preferred embodiments thereof, variations and modifications of the present invention can be effected within the spirit and scope of the following claims.

The invention claimed is:

1. A method, comprising:
    applying, by a press, a microsphere adhesive to a first surface of a substrate at a location defined by printed contour lines printed on the substrate and deposited on the substrate as a first adhesive bump on the first surface representing a first adhesive patch, and applying, by the press, a second adhesive as a second adhesive bump on top of the first adhesive bump, the microsphere adhesive applied as an adhesive patch to the first surface;
    coating, by the press, a second surface of the substrate with a water-based non-silicon release coating formulation, wherein the water-based non-silicon release coating formulation comprises approximately 5% or less of silicon by weight; and
    drying, by the press, the microsphere adhesive and the second adhesive on the first surface of the substrate.

2. The method of claim 1, wherein applying further includes adjusting one or of: a rheology of the microsphere adhesive, a tack of the microsphere adhesive, and a color of the microsphere adhesive by adding chemicals to the microsphere adhesive.

3. The method of claim 2, wherein adjusting further includes adding the chemicals as one or more of: rheology modifiers, optical brightening agents, and runnability enablers.

4. The method of claim 1, wherein drying further includes drying, by the press, the microsphere adhesive without using chill rolls during the drying.

5. The method of claim 4, wherein drying further includes adhesive drying, by the press, the microsphere with fans after initially drying, by the press, the microsphere adhesive with driers to assist in the drying of the microsphere adhesive on the first surface.

6. A method, comprising:
    formulating a water-based non-silicon release coating at least comprising a fluorochemical and a non-silicone release agent, wherein the water-based non-silicon release coating formulation comprises approximately 5% or less of silicon by weight;
    obtaining a water-based adhesive comprising a repositionable microsphere adhesive;
    obtaining a second adhesive;
    depositing the water-based adhesive as a first adhesive patch printed as a first adhesive bump on a first surface of a substrate;
    printing the second adhesive as a second adhesive patch on top of the first adhesive bump; and
    coating the water-based non-silicon free release coating on a second surface of the substrate;
    wherein the depositing, the printing, and the coating, are performed by a press against a web of the substrate defining a plurality of individual labels.

7. The method claim 6, further comprising winding a web of the substrate into a roll of labels.

8. The method of claim 6, wherein formulating further includes formulating the water-based non-silicon release coating as a mixture comprising the fluorochemical, a starch, a defoamer, the non-silicon release agent, and a catalyst.

9. The method of claim 6, wherein the second surface of the substrate is pre-coated with thermal print-activated layer.

10. The method of claim 6, wherein depositing further includes drying the first adhesive with driers on the first surface and thereafter further drying the first adhesive with fans.

11. The method of claim 10, wherein printing further includes applying a chiller roll to the substrate after the drying with the fans to cool down the substrate before printing the second adhesive on the first surface on top of the first adhesive.

12. The method of claim 6, wherein depositing further includes adding a brighten agent to the first adhesive to identify the first adhesive bump on the first surface of the substrate before depositing the first adhesive on the first surface of the substrate.

\* \* \* \* \*

UNITED STATES PATENT AND TRADEMARK OFFICE
CERTIFICATE OF CORRECTION

PATENT NO. : 10,920,114 B2
APPLICATION NO. : 16/721585
DATED : February 16, 2021
INVENTOR(S) : Wild et al.

Page 1 of 1

It is certified that error appears in the above-identified patent and that said Letters Patent is hereby corrected as shown below:

In the Claims

In Column 10, Line 31, in Claim 5, before "drying,", delete "adhesive"

In Column 10, Line 31, in Claim 5, after "microsphere", insert --adhesive--

In Column 10, Line 54, in Claim 5, after "method", insert --of--

Signed and Sealed this
Fourth Day of May, 2021

Drew Hirshfeld
*Performing the Functions and Duties of the
Under Secretary of Commerce for Intellectual Property and
Director of the United States Patent and Trademark Office*